June 17, 1924.
F. N. JOHNSTON
1,498,381
AUTOMATIC AIR BRAKE CONTROL MECHANISM
Filed Aug. 29, 1923     3 Sheets-Sheet 3
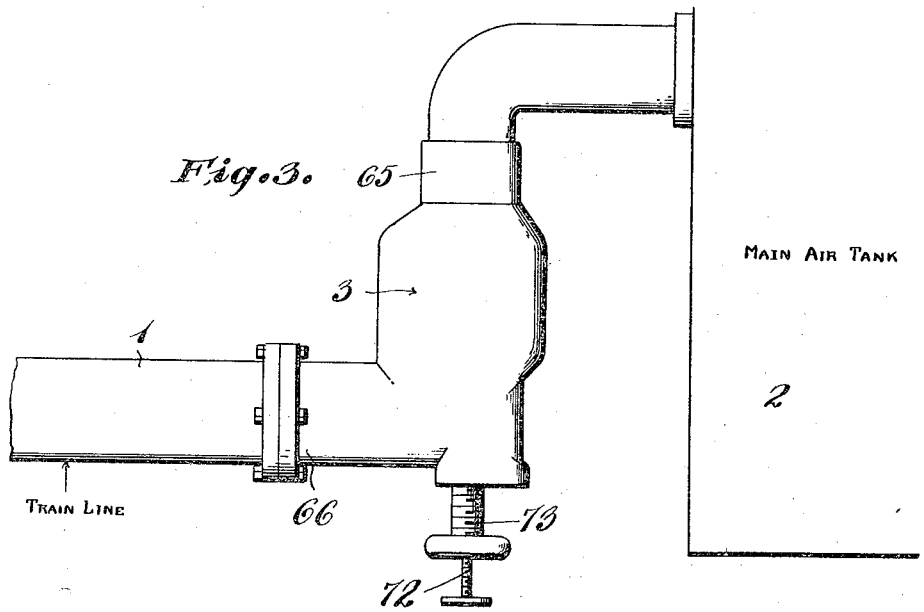
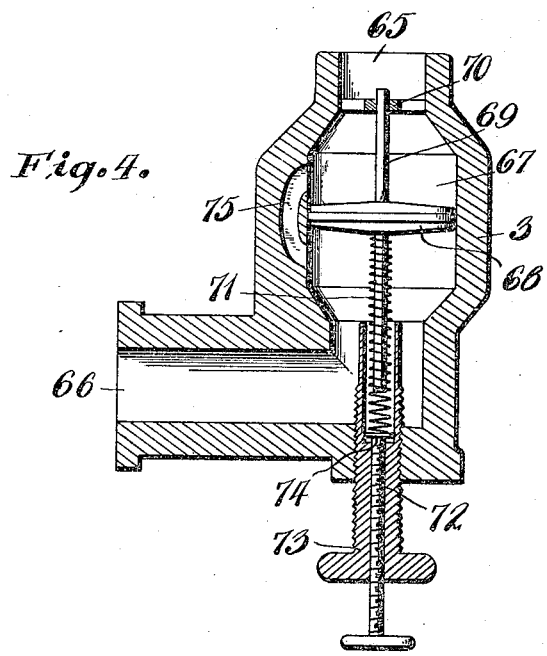
Inventor
Frank N. Johnston
By William C. Linton
Attorney Patented June 17, 1924.

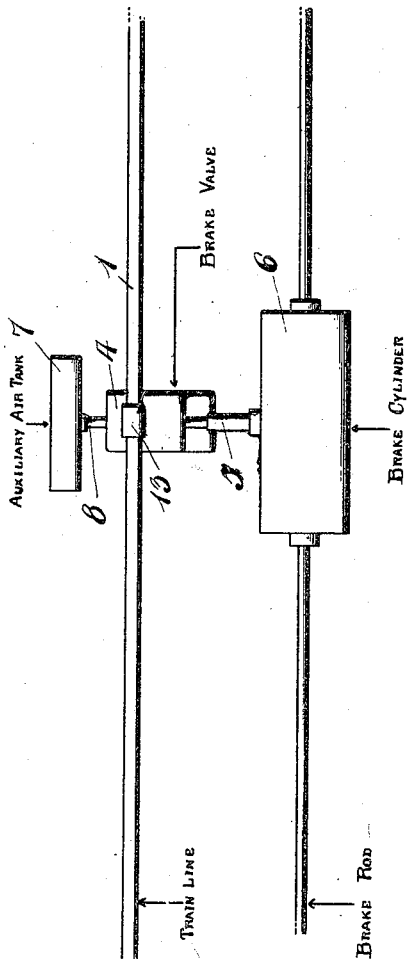

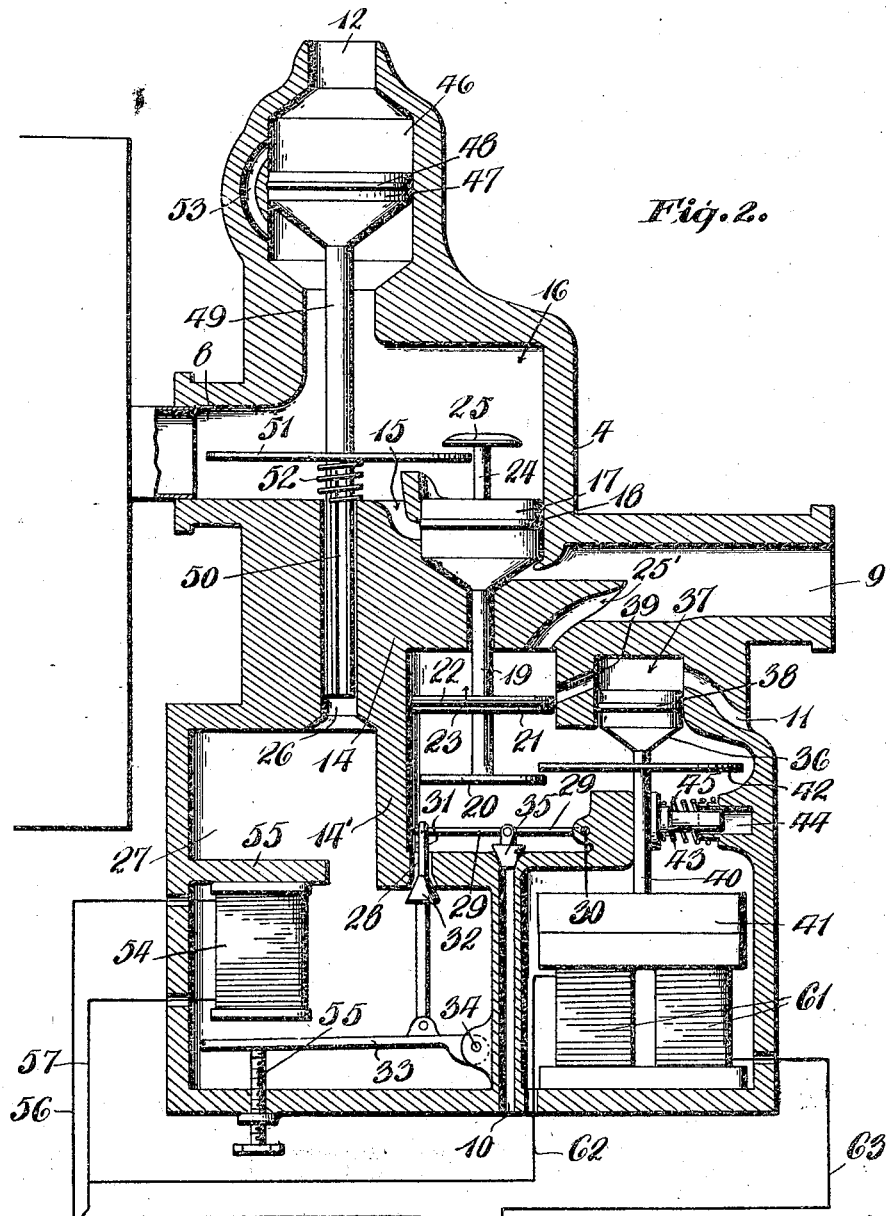

1,498,381

UNITED STATES PATENT OFFICE.

FRANK N. JOHNSTON, OF CHEYENNE, WYOMING, ASSIGNOR OF ONE-HALF TO C. Y. BEARD, OF CHEYENNE, WYOMING.

AUTOMATIC AIR-BRAKE CONTROL MECHANISM.

Application filed August 29, 1923. Serial No. 659,995.

*To all whom it may concern:*

Be it known that I, FRANK N. JOHNSTON, a citizen of the United States of America, residing at Cheyenne, in the county of Laramie and State of Wyoming, have invented certain new and useful Improvements in Automatic Air-Brake Control Mechanisms; and I do hereby declare that the following is a full, clear, concise, and exact description of the invention, such as will enable others skilled in the art to which it appertains to make and use the same.

This invention relates to improvements in automatic air brake control mechanisms, being especially adaptable for use upon railway rolling stock, whereby the compressed air utilized may be conducted to the braking mechanism of each car of a train equipped with the invention simultaneously, thus permitting of collective operation of such braking mechanism and by consequence, expediting the braking operation.

It is also an object of the invention to provide a brake control mechanism whereby the supply of compressed air to the braking mechanisms of the various cars of a train may be kept constant and uniform, thus enabling the effectual application of the brakes for a prolonged period of time, as where a train is moving down a long grade or incline, where with the equipment heretofore prevalent, it was necessary to mainly depend upon the hand or manually operable brakes of the individual cars because of the inadequacy of the supply of compressed air to the automatic braking mechanisms.

Yet another object of the invention is to provide the control mechanism with a novel form of automatically operable feed regulating valve, so constructed as to maintain a constant and uniform pressure of air in the train pipe line in order that an adequate supply of air may be had in the same at all times.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

In these drawings:

Figure 1 is a semi-diagrammatic view showing the invention arranged in the train pipe line of an equipped train;

Figure 2 is an enlarged vertical section through the control mechanism;

Figure 3 is an enlarged detail in side elevation of the feed regulating valve; and, Figure 4 is a vertical section therethrough.

Having more particular reference to the drawings, in connection with which like characters of reference will designate corresponding parts throughout, the invention is adapted to be interposed in the train pipe line 1 of a railway train, including, as will be understood, a multiplicity of cars, the locomotive of which carries a main fresh air supply or storage reservoir 2, coupled thereto through the feed regulating valve herein generally indicated by the numeral 3; the control mechanism comprising a housing 4 including inlet and outlet ports hereinafter more fully described, the outlet port being connected by a conduit 5 to the brake mechanism or cylinder 6 of the particular car upon which it is arranged. In this connection, it should be noted that one of these control mechanisms is supplied to each of the brake cylinders 6 of the various cars composing a train equipped with the invention. However, inasmuch as each of these control mechanisms are of corresponding or identical construction reference will be hereinafter made to but one.

Each of the braking mechanisms are supplied with an auxiliary air tank or reservoir 7, carried upon each of the particular cars receiving the same a conduit 8 establishing communication as between said tank and the inlet port of the housing 4 of the brake control mechanism, hereinafter more fully described, As hereinbefore stated, the brake control mechanism may be stated to comprise a housing 4 having an inlet port 8, an outlet port 9 and several exhaust ports 10 and 11 respectively, these exhaust ports establishing communication as between the interior of the housing and the atmosphere. The inlet port 8 is connected to the auxiliary air tank 7 through the conduit 8, whereas the outlet port 9 is connected to the brake cylinder 6 through the medium of the conduit 5.

Another inlet port 12 is provided the housing 4 and is connected by means of a suitable key coupling or device 13, common in the art, to the train pipe line 1 and hence, to the main reservoir 2. Thus, it is apparent that the supply of air from the main reservoir 2 to the brake control mechanism housing 4 will be effected.

A wall 14 is formed within the housing 4 and is provided with a valve seat so positioned as to permit of the control or regulation of communication as between the inlet port 8 and the outlet port 9 of the mechanism; a by-path 15 communicating with the upper chamber directly adjacent the port 8 and indicated by the numeral 16 and with the valve seat; the opposite side of said valve seat being connected to and communicating with the inner end of the outlet port 9. A valve 17 having a tapered lowered portion is snugly seated within the seat provided therefor by the wall 14 and carries upon its peripheral portion a packing band 18 whereby to prevent the escape of air thereby from the chamber 16 to the outlet port 9. This valve 17 is provided with a dependent stem portion 19 extending through an opening formed in an adjacent portion of the wall 14 and carries upon its extreme lower end a disk 20, while a piston 21 is carried upon the intermediate portion thereof, such piston being provided with a peripheral packing ring 22, which as shown in the Figure 2, is adapted to be snugly engaged with the wall of the cylinder provided therefor in the lower portion of the housing 4 and indicated by the numeral 23. Another stem 24 is extended upwardly from the top or upper side of the valve 17 and carries thereon a disk 25, the purpose of which will be hereinafter more fully described.

In this connection, it may be also here noted that a by-path 25' is formed in the wall 14 and establishes communication between the port 9 and the cylinder 23.

A way 26 is formed in the thickened portion of the wall 14 and serves to establish communication between the chamber 16 and the chamber 27 arranged in the lower portion of the housing 4, said chamber 27 being divided from the cylinder 23, receiving the piston 21 by means of an extension 14' of the wall 14, which extension, as will be noted, is of substantially right angular formation as is clearly shown in the Figure 2 and has a port or way 28 formed in one portion thereof, the lower end of which is enlarged to receive valve means to be presently described.

Valve means are provided for controlling communication between the cylinder 23 and the lower chamber 27, comprising an arm 29 pivotally mounted, as at 30, upon a bracket-like extension of the wall 14' and extending to a position in proximity to the way 28. A valve stem 31 carrying a conical valve 32 thereon is pivotally connected at its upper end to the adjacent or free end of the arm 29, while the lower end of the stem 31 is likewise pivotally connected to an adjacent portion of an armature 33 pivotally mounted upon a bracket 34 formed integral with or secured to an adjacent portion of the wall extension 14', as shown in the Figure 2. A second conical valve 35 is pivotally connected to the intermediate portion of the arm 29 and is adapted to be engaged, at times, in the seat provided therefor in the upper end of the exhaust port 10, whereas the valve 32 is adapted to be engaged, at times, in the enlarged or flared open end of the way 28. At this point, it is to be noted that the seating of the valves 32 and 35 is alternate, that is, when the valve 32 is seated the valve 35 will be open and the reverse when the valve 35 is seated.

Another valve of the piston type is provided within the housing 4 and is adapted to control communication as between the cylinder 23 and the exhaust port 11, said valve being indicated herein by the numeral 36 and snugly working within a cylinder 37 formed in the intermediate portion of the housing 4 directly adjacent the outlet port 9, but separate therefrom; a packing ring 38 being arranged about the peripheral portion of said valve 36 for an obvious purpose. Communication between the cylinder 23 and the cylinder 37 is established by way of a port or way 39.

This valve 36 is provided with a dependent stem portion 40 carrying an armature 41 upon its lower end, while a disk 42 is fixedly mounted upon the intermediate portion thereof and is adapted to overlie the disk 20 carried upon the lower end of the valve stem 19, as is clearly shown in the Figure 2. To check or drag the movement of the valve 36 in its cylinder 37, I may and preferably do provide a plunger 43, the rod of which is snugly received in a pocket 44 formed in one side wall of the housing 4 and receives thereabout, an expansible coiled spring 45, one end of which bears upon the walls of the pocket 44, while the opposite end has bearing upon the head of the plunger, which latter is adapted to have frictional contact with an adjacent portion of the valve stem 40. Thus, it will be understood that a check or drag will be provided the valve 36 and in consequence, its movement will be somewhat retarded.

To control the passage of compressed air into the housing 4 by way of the inlet port 12 from the main reservoir 2, a chamber or cylinder 46 is formed in the upper end and reduced portion of said housing and snugly and slidably receives therein a piston-type of valve 47 provided with the usual packing ring 48 and carrying a dependent valve stem 49, the lower end of which is provided with a plurality of longitudinally disposed ribs 50 and is loosely and slidably received in the way 26 establishing communication between the chambers 16 and 27. A disk 51 is fixedly carried upon the intermediate portion of the valve stem 49 and is adapted to underlie a disk 25 carried upon the upper end of the valve stem 24 on the valve 17. This valve 47 is normally held in an open position by means of an expansible coiled spring 52 arranged about the intermediate portion of said stem 49 and bearing at one end upon the adjacent portion of the wall 14 and at its other end upon a portion of the disk 51. With the valve 47 in its open position, compressed air will be permitted to flow into the housing 4 by way of the inlet 12 through a by-path 53 formed in the side wall of the cylinder 46 into such cylinder and thence into the chamber 16. However, should the valve 47 move upwardly to its closed position whereat the peripheral portion will overlie the upper end of the by-path 53, it will be understood that the supply of air from the main reservoir 2 through the inlet port 12 and into the chamber 16 will be discontinued; the tension of the spring 52 together with the pressure of air from the auxiliary reservoir 7 discharged into the chamber 16 exerting sufficient upward thrust upon the valve 47 to remove it to its closed position and retain the same thereat.

In order that the valves 32 and 35 may be automatically operated whereby to control the admission of air to the cylinder 23 from the chamber 27 and the exhaust of such air from the cylinder 23 to the exhaust port 10, an electromagnet 54 is mounted upon a bracket extension 55' within the chamber 27 and is so arranged, as to, when energized, attract the free end or extremity of the armature 33 into engagement therewith, movement of said armature 33 away from the electromagnet being regulatable by means of an adjustable stop screw 55 turned into the casing 4 by way of a screw threaded opening formed in the bottom thereof. Electrical conductors 56 and 57 are connected to the opposite terminals of the electromagnet 54 and extend through suitably packed openings in the adjacent side walls of the housing 4 into engagement with a suitable source of energy 58 and the contact terminal 59 of a multiple throw switch 60, as is shown in the Figure 2.

Other electromagnets 61 are arranged within the bottom of the housing 4, as shown in the Figure 2, and are so positioned as to, with energization, attract the armature 41 into contact therewith, thus causing movement of the valve 36 connected thereto. Conductors 62 and 63 are extended from the opposite terminals of these electromagnets 61, the conductor 62 being connected to the conductor 57 extending into engagement with one side or pole of the source of energy 58, while the conductor 63 is extended into engagement with a contact point 64 arranged upon the multiple throw switch 60, this latter being connected to the opposite side of the source of energy by means of a suitable conductor 60'.

The feed regulating valve 3, hereinbefore generally referred to, serves to regulate or control the passage of compressed air from the main reservoir 2 into the train pipe line 1, comprising an elbow-like or right angular conduit coupling having an inlet port 65 and an outlet port 66; a cylindrical chamber 67 being formed in one portion of the coupling directly adjacent the inlet port 65 and having a piston 68 snugly and slidably received therein, said piston being carried upon the intermediate portion of a rod 69, one end of which is slidably received through the guide opening of a spider 70 while the opposite extremity thereof is received in the convolutions of an expansible coiled spring 71 seated at its outer end in the cup-shaped receptacle provided in the adjacent end of an adjusting screw 72 turned into engagement with a screw threaded opening formed in one portion of the coupling and having a screw threaded bore extending longitudinally therethrough and receiving a screw threaded adjusting rod 73 having its inner end headed as at 74 and engaged with the adjacent convolutions of the expansible coiled spring 71 whereby the tension of said spring may be modified or varied to the desired nicety whereby to regulate the exertion of pressure therefrom onto the slidable piston 68.

The cylinder 67 has provided in one wall thereof, a by-path 75, which when the piston is in its normal equalized position will permit the passage of air from the inlet port 65 to and through the outlet port 66 which is connected at its flanged end with the train pipe line 1, hereinbefore described.

In operation, when it is desired that the air pressure in the braking mechanism equipped with the control device be retained, the electromagnet 54 is energized by swinging the switch closing element of the switch 60 so that it contacts with the contact point 59. Upon energization of the electromagnet 54, the armature 33 will be immediately attracted into engagement therewith, thus moving the conical valve 32 onto its seat in the way 28 and closing the same, whereas the valve 35 will be lifted from and open the inner end of the exhaust port 10. Thus, compressed air within the cylinder 23 will immediately pass by way of the exhaust port 10 into the atmosphere, relieving the piston 21 of pressure and in consequence, permitting the valve 17 to return to its seated or closed position with respect to the seat provided therefor in the wall 14, thus interrupting communication between the chamber 16 and the outlet port 9. During this movement of the valve 17 to its closed position, it will of course be understood that the valve 36 will remain in its closed position within the cylinder 37, thus preventing the passage of air by way of the outlet port 9 through the by-paths 25' and 39 through the exhaust 11 into the atmosphere. When it is desired to supply further air to the brake cylinder 6 from the chamber 16, the electromagnet 54 is then deenergized, permitting the swinging armature 33 to drop back upon the adjustable screw 55. Such movement will cause the opening of the valve 32 and the closing of the valve 35, hence, permitting the passage of air from the chamber 16 through the way 26 into the chamber 27 through the way 28 into the chamber 23, whereupon it will exert pressure upon the piston 21, moving the same upwardly and thus, unseating and opening the valve 17, permitting air to then flow from the chamber 16 through the by-path 15 into the outlet port 9.

To release the brake, the electromagnets 61 are energized by moving the switch element of the switch 60 into contact with the contact point 64. Such energization of the electromagnets 61 will cause attraction of the armature 41 into engagement with the same, moving the piston valve 36 to its downward or open position and establishing communication as between the way 39 and the exhaust port 11. Thus, the air pressure in the brake cylinder 6 will be relieved by passage of the same through the outlet port 9, the by-path 25', the by-path 39, through the cylinder 37 into and through the exhaust port 11 into the atmosphere.

In this connection, it may be here noted that with the opening of the valve 17 in the manner hereinbefore explained, the upward movement of the stem 19 will cause the disk 20 to be brought into engagement with an adjacent portion of the disk 42 carried upon the stem 40 of the valve 36, thus moving the latter upwardly and interrupting communication between the way 39 and the exhaust port 11 so as to prevent any escape of air from the outlet port 9 through the by-paths 25' and 39 and then through the exhaust port 11. Because of the frictional contact of the retarding device in form of the plunger 43 upon the stem 40 of the valve 36, it will be understood that said valve will be releasably held in its particularly adjusted position.

In the event of failure of the electromagnet 54 to properly function, it of course will be understood that the armature 33 will drop to its inactive position, thus opening the valve 32 and permitting the application of air pressure to the under side of the piston 21 whereby to open the valve 17 and admit the passage of compressed air from the chamber 16 into the outlet port 9 whereby to actuate the air braking mechanism. Thus, the braking mechanism cannot be rendered inoperative until the electromagnet 54 or its conductors or other accessories have been properly repaired.

In the event that the train should become broken, that is, the cars separated or the train pipe line separated or broken, supply of air will still be had to the chamber 16 from the auxiliary reservoir 2, such supply of air together with the pressure of the expansible coiled spring 52 causing the valve 47 to be moved upwardly to its closed position with respect to the by-path 53 in the cylinder 46. Thus, the escape of air from the chamber 16 by way of the by-path 53 and the inlet port 12 will be avoided and at the same time, constant and uniform pressure of air will be had in the chamber 16 for supply to the brake cylinder 6 by way of the outlet port 9. During such upward movement of the valve 47 under influence of the spring 52 and the air pressure from the auxiliary reservoir 2, it will be also noted that the disk 51 will engage with and impart an upward thrust to the disk 25 carried upon the upper end of the stem 24 of the valve 17, hence, moving said valve 17 to its upper or open position and permitting of the passage of air through the by-path 15 into the outlet port 9 and from thence to the braking mechanism for actuating the same. Thus, the train will be automatically braked and will remain so until connection between the train pipe line or the main reservoir and the inlet 12 is effected, whereupon the air pressure upon the opposite sides of the piston 47 will be equalized and said piston will be caused to return to its open position.

The air feed regulator 3 will serve as a means for keeping the pressure of air in the train pipe line constant and uniform, inasmuch as the tension of the spring 71 is so adjusted as to act in combination with the pressure of air in the train pipe line usually between sixty and seventy pounds to equalize the pressure applied upon said piston from the main reservoir or train pipe line which usually averages approximately ninety pounds. Thus, the valve 68 will be held in its closed position with respect to the by-path 75. However, should for any reason the pressure of air in the train pipe line diminish or be reduced, the pressure upon the opposite side of the piston 68 from the main reservoir 1 will counteract that of the diminished air pressure and the expansible coiled spring 71 and will cause said valve to be moved to its open position with respect to the by-path 75, thus permitting the flow of air from the main reservoir 2 through the inlet 65, through the regulator by way of its port 66 into the train pipe line. Thereby, the normal or desirable pressure of air will be reestablished in the train pipe line whereupon the valve 68 will again be balanced and in consequence, returned and retained in its closed position with respect to the by-path 75. Of course, the pressure of the spring 71 may be regulated to that desired nicety in order that there will be a perfect balance as between the pressures applied to the opposite sides of the valve 68.

Manifestly, the construction shown is capable of considerable modification and such modification as is within the scope of my claims, I consider within the spirit of my invention.

I claim:

1. In air brake mechanism, automatic control means therefor comprising a housing interposed in the train pipe line and connected to the air brake mechanism having communicating inlet, outlet and exhaust ports, an automatically operated valve controlling communication between said inlet and outlet ports, means for effecting movement of said valve, another valve for controlling the exhaust port adapted to be connected with and to actuate said first valve, at times, and means for effecting movement of said second valve.

2. In air brake mechanism, automatic control means therefor comprising a housing interposed in the train pipe line and connected to the air brake mechanism having communicating inlet, outlet and exhaust ports, a pressure operated valve for controlling communication between said inlet and outlet ports, means for automatically effecting movement of said valve, another valve for controlling the exhaust port adapted to be connected with and to actuate said first valve, at times, and means for effecting movement of said second valve.

3. In air brake mechanism, automatic control means therefor comprising a housing interposed in the train pipe line and connected to the air brake mechanism having communicating inlet, outlet and exhaust ports, a pressure operated valve for controlling communication between said inlet and outlet ports, electrical means for effecting movement of said valve, another valve for controlling the exhaust port adapted to be connected with and to actuate said first valve, at times, and electrical means for effecting movement of said second valve.

4. In air brake mechanism, automatic control means therefor comprising a housing interposed in the train pipe line and connected to the air brake mechanism having communicating inlet, outlet and exhaust ports, an automatically operable valve controlling communication between said inlet and outlet ports, means for effecting movement of said valve, another valve for controlling the exhaust port adapted to be connected with and to actuate said first valve, at times, means for retarding movement of said second mentioned valve, and other means for imparting movement of the second mentioned valve.

5. In air brake mechanism, automatic control means therefor comprising a housing interposed in the train pipe line and connected to the air brake mechanism having communicating inlet, outlet and exhaust ports, a pressure operated valve controlling communication between said inlet and outlet ports, said valve having a disk supported thereupon and depending from the same, means for effecting movement of said valve, another valve for controlling the exhaust port, means on said second mentioned valve engageable with said means on the first mentioned valve for imparting movement thereto, at times, and means for effecting movement of said second mentioned valve.

6. In air brake mechanism, automatic control means therefor comprising a housing interposed in the train pipe line and connected to the air brake mechanism having communicating inlet, outlet and exhaust ports, an automatically operable valve controlling communication between said inlet and outlet ports, said valve having a stem depending therefrom, a trip on said stem, another valve for controlling the exhaust port having a stem thereon, trip means on said stem adapted to be engaged with said first trip means, at times, for imparting motion to the first mentioned valve, and electrical means for effecting movement of said second mentioned valve.

7. In air brake mechanism, automatic control means therefor comprising a housing interposed in the train pipe line and connected to the air brake mechanism having communicating inlet, outlet and exhaust ports, a pressure operated valve controlling communication between said inlet and outlet ports, means for effecting movement of said valve, said valve having a stem depending therefrom, a trip carried on said stem, another valve for controlling the exhaust port, a trip carried upon said second mentioned valve engageable with said first trip for imparting movement of the first valve, at times, retarding means engaged with said second mentioned valve for releasably securing the same in an adjusted position, and means for automatic movement of said second mentioned valve.

8. In air brake mechanism, automatic control means therefor comprising a housing interposed in the train pipe line and connected to the air brake mechanism having communicating inlet, outlet and exhaust ports, a valve controlling communication between said inlet and outlet ports, said valve having a stem depending therefrom, a piston carried upon the lower portion of said stem engaged in a cylindrical chamber formed in said housing, means for effecting movement of said valve by applying air pressure to said piston, another valve for controlling the exhaust port adapted to be engaged with and actuate said first valve, at times, and means for effecting movement of said second valve.

9. In air brake mechanism, automatic control means therefor comprising a housing interposed in the train pipe line and connected to the air brake mechanism having communicating inlet, and outlet ports therein, a valve for controlling communication between said inlet and outlet ports, said valve having a stem depending therefrom and received in a cylindrical chamber formed in said housing, a piston carried upon said stem also receivable in said cylindrical chamber, and means for effecting the admission of air pressure to said piston.

10. In air brake mechanism, automatic control means therefor comprising a housing interposed in the train pipe line and connected to the air brake mechanism having communicating inlet, outlet and exhaust ports, a valve controlling communication between said inlet and outlet ports, said valve having a stem depending therefrom, a piston received on one portion of said stem and snugly and slidably engaged in a cylindrical chamber formed in the housing, a trip carried upon the lower extremity of said stem, means for controlling the admission of air pressure to said piston, another valve for controlling the exhaust port, a trip carried by said second mentioned valve engageable with said first mentioned trip for actuating the first mentioned valve, and means for effecting movement of said second mentioned valve.

11. In air brake mechanism, automatic control means therefor comprising a housing interposed in the train pipe line and connected to the air brake mechanism having communicating inlet, outlet and exhaust ports therein, a valve controlling communication between said inlet and outlet ports, said valve having a stem depending therefrom, a piston carried upon one portion of said stem and snugly and slidably received within a cylindrical chamber in the housing, a disk carried upon the lower end of said stem, certain of the walls of said cylindrical chamber having by-passes formed therein adapted to communicate, at times, with the exhaust ports, a second valve for controlling said exhaust ports interposed between the same and one of said by-passes and snugly and slidably received in a cylindrical chamber in the housing, a disk carried by said second mentioned valve engageable with said first disk for imparting motion to said first valve, and means for automatically effecting movement of said second valve.

12. In air brake mechanism, automatic control means therefor comprising a housing interposed in the train pipe line and connected to the air brake mechanism having communicating inlet, outlet and exhaust ports, a valve for controlling communication between said inlet and outlet ports, said valve having a stem depending therefrom, a piston carried upon one portion of said stem and snugly and slidably received in a cylindrical chamber formed in said housing, a disk carried upon the lower extremity of said stem, valve means for controlling the admission of air pressure to said piston and controlling one of said exhaust ports, said valve means alternately seating, another valve for controlling the remaining exhaust ports snugly and slidably received within a second cylindrical chamber in the housing, said first and second mentioned chambers and the outlet port being intercommunicating, at times, a disk carried upon said second mentioned valve engageable with said first disk for imparting motion to the first valve, at times, means for releasably securing said second mentioned valve in an adjusted position, and electrical means for effecting movement of said second valve.

13. In air brake mechanism, automatic control means therefor comprising a housing interposed in a train pipe line and connected to the air brake mechanism having communicating inlet, outlet and exhaust ports, a valve controlling communication between said inlet and outlet ports, said valve having a stem depending therefrom, a piston on said stem snugly and slidably received in a cylindrical chamber in the housing, a disk carried upon the lower end of said stem, collectively operable valve means for controlling the admission of air pressure to said piston and the exhaustion of said air pressure from said cylindrical chamber through one of said exhaust ports, automatically operable means for effecting such collective operation of said valve means, a second valve snugly and slidably received within a second cylindrical chamber in the housing, said first and second mentioned cylindrical chambers and the outlet port being intercommunicating, at times, a disk carried upon said second mentioned valve engageable with said first disk for imparting motion to the first valve, at times, means for retarding sliding movement of said second mentioned valve, and electrical means for effecting movement of said second mentioned valve.

14. In air brake mechanism, automatic control means therefor comprising a housing interposed in the train pipe line and connected to the air brake mechanism having communicating inlet and outlet ports, an automatically operable valve controlling communication between said inlet and outlet ports, means for effecting movement of said valve, another valve received in a cylindrical chamber adjacent another of the inlet ports of said housing adapted to be normally retained in an open position to permit the passage of air thereby from the main reservoir of the train pipe line, and means carried by said second mentioned valve engageable with the first mentioned valve for opening the same, at times.

15. In air brake mechanism, automatic control means therefor comprising a housing interposed in the train pipe line and connected to the air brake mechanism having communicating inlet and outlet ports, an automatically operable valve for controlling communication between one of said inlet ports and said outlet port, means for effecting movement of said valve, another valve snugly and slidably received within a cylindrical chamber formed adjacent the remaining inlet port adapted to be normally retained in its open position for permitting the passage of air by the same from the train pipe line into said housing, a trip carried upon a portion of the valve stem and arranged below the same, and another trip carried upon said first valve adapted to be engaged by said first mentioned trip whereby to impart motion to the first valve.

16. In air brake mechanism, automatic control means therefor comprising a housing interposed in the train pipe air line and connected to the air brake mechanism having communicating inlet, outlet and exhaust ports, an automatically controlled valve controlling communication between one of said inlet ports and said outlet port, means for effecting movement of said valve, another valve for controlling the exhaust port adapted to be engaged with and to actuate said first valve, at times, means for effecting movement of said second valve, and a third valve snugly and slidably received within a cylindrical chamber in the housing adjacent the remaining inlet port, said third valve being adapted to be normally retained in its open position, and means carried by said third valve engageable with the first mentioned valve for moving the same to its open position, at times.

17. In air brake mechanism, automatic control means therefor comprising a housing interposed in the train pipe line and connected to the air brake mechanism having communicating inlet, outlet and exhaust ports, a valve controlling communication between one of said inlet ports and said outlet port, said valve having a stem depending therefrom, a piston carried by said stem snugly and slidably received in a cylindrical chamber in the housing, trip means carried upon said stem below said piston, collectively operable valve means for controlling the admission of air pressure to said cylindrical chamber and from the same by way of the one of said exhaust ports, said valve means being adapted to be alternately seated, another valve controlling the remaining exhaust port snugly and slidably received within a second cylindrical chamber in the housing, said first and second cylindrical chambers and the outlet port being intercommunicating, at times, trip means carried upon said second mentioned valve engageable with said first trip means, means for retarding and releasably retaining said second mentioned valve in an adjusted position, electrical means for effecting movement of said second mentioned valve, a third valve snugly and slidably received within another cylindrical chamber formed in the housing adjacent the remaining inlet port, said valve being adapted to be normally retained in its open position to permit the passage of air from the train pipe line into the housing, and means on said third valve engageable with the first valve for opening the same with movement of the former in one direction.

18. In air brake mechanism, automatic control means therefor comprising a housing interposed in the train pipe line and connected to the air brake mechanism having communicating inlet, outlet and exhaust ports therein, an automatically operable valve for controlling communication between one of said inlet ports and said outlet port, means for effecting movement of said valve, another valve for controlling the exhaust port adapted to be engaged with and to actuate said first valve, at times, means for automatically effecting movement of said second valve, a third valve snugly and slidably received in a cylindrical chamber in the housing adjacent the remaining inlet port adapted to be normally retained in its open position whereby to permit the passage of air by the same from the train pipe line into said housing, means carried by said third valve engageable with said first valve for opening the same, at times, and an auxiliary reservoir connected to and communicating with said first mentioned inlet port.

19. In air brake mechanism, automatic control means therefor comprising a housing interposed in the train pipe line and connected to the air brake mechanism having communicating inlet, outlet, and exhaust ports therein, said housing having a chamber formed therein, a valve seated in said chamber for controlling communication between the same and the outlet port, said valve having a stem depending therefrom, a piston carried upon the stem snugly and slidably received in a cylindrical chamber in the housing, a trip carried on the lower end of said stem, valve means for controlling the passage of air pressure from said first chamber into engagement with said piston and for controlling of one of said exhaust ports, said valve means being alternately seated, automatic means for effecting collective operation of said valve means, another valve snugly and slidably received within another cylindrical chamber within the housing having a stem depending therefrom, said first and second mentioned cylindrical chambers and said outlet port intercommunicating, at times, means for releasably securing said second mentioned valve in an adjusted position, trip means on said second mentioned valve engageable with said first mentioned trip means, another valve snugly and slidably received within a third cylindrical chamber formed in the housing adjacent the inlet port thereof adapted to be normally retained in its open position whereby to permit the passage of air from the train pipe line into said first mentioned chamber, trip means carried by said last mentioned valve engageable with the first valve for raising the same to open position, at times, and an auxiliary reservoir connected to the remaining inlet port.

20. In air brake mechanism, automatic control means therefor comprising a housing interposed in the train pipe line and connected to the air brake mechanism having inlet, outlet, and exhaust ports therein, said housing having a chamber therein communicating with the inlet ports, a valve for controlling communication between the chamber and the outlet port, said valve having a stem depending therefrom, a piston carried on said stem snugly and slidably received in a cylindrical chamber in the housing, a trip carried on said stem, alternately seatable valves arranged directly below said valve stem, one for controlling the passage of air pressure from said chamber into the cylindrical chamber and the other for controlling the exhaustion of air pressure from the cylindrical chamber through one of said exhaust ports, electromagnetically actuated means for collectively operating said valve means, a second valve snugly and slidably received within a second cylindrical chamber in the housing, said first mentioned cylindrical chamber and the outer port intercommunicating, at times, trip means carried on said second mentioned valve adapted to be engaged by said first trip means, spring means for releasably retaining said second valve in its adjusted positions, electromagnetically operated means for imparting movement to said second mentioned valve, a third valve snugly and slidably received within a third cylindrical chamber in the housing adjacent one of said inlet ports adapted to be normally retained in its open position whereby to permit the passage of air from the train pipe line into said first chamber, trip means carried by said third valve engageable with the first valve whereby to raise the same to open position, at times, and an auxiliary reservoir connected to the remaining inlet and communicating with said first chamber.

21. In combination with an automatic air brake mechanism control means, an air pressure feed regulating device interposed in the train pipe line between the automatic control means and the main air reservoir of the train pipe line, said device comprising a housing having inlet and outlet ports and a cylindrical chamber formed in one portion thereof having a by-pass formed in one wall of the same, a piston carried upon the intermediate portion of a rod snugly and slidably received in said chamber, a screw having the inner end thereof crumped and turned into engagement with one of said housing, an adjusting screw turned into engagement with a longitudinally screw threaded bore in said first screw, and spring means connecting the inner end of said second mentioned screw and the adjacent end of the piston carrying rod.

In witness whereof I have hereunto set my hand.

FRANK N. JOHNSTON.